United States Patent
Thomczyk et al.

(10) Patent No.: US 9,193,527 B2
(45) Date of Patent: Nov. 24, 2015

(54) CONVEYING INSTALLATION HAVING AN IMPACT-ABSORPTION-RESISTANT WEAR-PROTECTION MEANS

(71) Applicant: ContiTech Transportbandsysteme GmbH, Hannover (DE)

(72) Inventors: Andrea Thomczyk, Goettingen (DE); Frank Kantorek, Lehrte (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 14/533,421

(22) Filed: Nov. 5, 2014

(65) Prior Publication Data

US 2015/0053532 A1 Feb. 26, 2015

Related U.S. Application Data

(63) Continuation of application No. PCT/EP2013/059093, filed on May 2, 2013.

(30) Foreign Application Priority Data

May 7, 2012 (DE) .......................... 10 2012 103 967

(51) Int. Cl.
  *B65G 17/36* (2006.01)
  *B65G 15/08* (2006.01)
  *B65G 11/16* (2006.01)
  *B65G 37/00* (2006.01)
  *B65G 39/12* (2006.01)

(52) U.S. Cl.
  CPC .............. *B65G 15/08* (2013.01); *B65G 11/166* (2013.01); *B65G 37/00* (2013.01); *B65G 39/12* (2013.01)

(58) Field of Classification Search
  CPC ............. B65G 2207/48; B65G 11/146; B65G 2201/04; B65G 11/16; B65G 11/166
  USPC ........ 198/550.01, 550.2; 193/2 R, 25 R, 25 A
  See application file for complete search history.

(56) References Cited

U.S. PATENT DOCUMENTS

| | | | | |
|---|---|---|---|---|
| 2,658,603 | A * | 11/1953 | Fernald ....................... | 193/25 C |
| 4,042,746 | A * | 8/1977 | Hofer .......................... | 428/308.4 |
| 4,529,660 | A * | 7/1985 | Heim ............................ | 193/2 R |
| 4,645,055 | A * | 2/1987 | Griese et al. ................. | 193/2 R |

(Continued)

FOREIGN PATENT DOCUMENTS

| | | |
|---|---|---|
| DE | 444099 C | 5/1927 |
| DE | 697992 C | 10/1940 |

(Continued)

OTHER PUBLICATIONS

U.S. Appl. No. 14/533,851, filed Nov. 5, 2014.

(Continued)

*Primary Examiner* — James R Bidwell
(74) *Attorney, Agent, or Firm* — Walter Ottesen P.A.

(57) ABSTRACT

A conveying installation has a conveying belt and also has drums, load-bearing rollers, load-bearing frameworks, and a transfer section. The conveying installation forms a material-conveying upper strand, with a transfer location for the conveying material, and an at least material-free lower strand. The transfer location contains at least one wear-protection system which contains at least one foamed polymer mix.

4 Claims, 2 Drawing Sheets

(56) References Cited

U.S. PATENT DOCUMENTS

| | | | | |
|---|---|---|---|---|
| 5,480,018 | A | * | 1/1996 | Sasaki .......................... 193/2 R |
| 5,705,250 | A | * | 1/1998 | Hudson, Jr. ...................... 428/99 |
| 6,684,999 | B1 | * | 2/2004 | Howard ........................ 193/2 R |
| 7,249,442 | B2 | | 7/2007 | Pellegrino et al. |
| 7,513,352 | B2 | * | 4/2009 | Sawall et al. ............... 193/25 R |
| 2009/0020391 | A1 | * | 1/2009 | McKeough ................. 193/25 B |

FOREIGN PATENT DOCUMENTS

| | | |
|---|---|---|
| DE | 1 756 248 A1 | 2/1970 |
| DE | 2 321 025 A1 | 11/1974 |
| DE | 245 177 A1 | 4/1987 |
| DE | 253 234 A1 | 1/1988 |
| DE | 254 182 A1 | 2/1988 |
| DE | 292 887 A5 | 8/1991 |
| DE | 10 2010 005 852 A1 | 7/2011 |
| EP | 0 213 282 A2 | 3/1987 |
| GB | 2 405 853 A | 3/2005 |
| JP | 53-69377 A | 6/1978 |
| JP | 2003-160214 A | 6/2003 |

OTHER PUBLICATIONS

U.S. Appl. No. 14/533,396, filed Nov. 5, 2014.
International Search Report dated Jul. 12, 2013 of international application PCT/EP2013/059093 on which this application is based.

* cited by examiner

CONVEYING INSTALLATION HAVING AN IMPACT-ABSORPTION-RESISTANT WEAR-PROTECTION MEANS

CROSS REFERENCE TO RELATED APPLICATIONS

This application is a continuation application of international patent application PCT/EP2013/059093, filed May 2, 2013, designating the United States and claiming priority from German application 10 2012 103 967.4, filed May 7, 2012, and the entire content of both applications is incorporated herein by reference.

FIELD OF THE INVENTION

The invention relates to a conveyor with at least one conveyor belt, and also with carrier rollers and carrier frames, where the conveyor forms a material-conveying upper web with a transfer section for the material to be conveyed, and a mostly material-free lower web. However, there are also conveyors where the lower web is also loaded.

BACKGROUND OF THE INVENTION

The material to be conveyed in the context of a conveyor is applied, in the form of a free-flowing solid for example, at a transfer section by means of a transfer hopper onto the conveyor belt. Transfer sections of this generic type, also termed input sections or input units, have been known for a long time: these are described by way of example in DE 10 2010 005 852 A1, DE 2 321 025, DE 1 756 248, DE 697 992, DE 444 099, DD 292 887 A5, DD 254 182 A1, DD 253 234 A1, or DD 245 177 A1.

The transfer section often comprises at least one transfer hopper. However, it can also take the form of chute, downpipe, or slide.

The transfer section part that is in direct contact with the material to be conveyed is mostly provided with a wear-protection system. The wear-protection system serves inter alia to reduce damage to the surfaces, which are often composed of metal, in particular in the case of transfer hoppers and of downpipes. The metal is thus also protected from corrosion. The wear-protection system moreover absorbs the energy of impact of the conveyed materials on the application location (shock absorption). The wear-protection system is mostly composed of a rubber mixture comprising at least one rubber component or one rubber component blend, at least one crosslinking agent or one crosslinking system comprising a crosslinking agent and an accelerator, and also mostly other mixture ingredients, in particular at least one filler and/or at least one processing aid and/or at least one aging inhibitor and/or at least one plasticizer and/or other additional substances (for example, fibers, color pigments). By virtue of the vulcanization of the rubber mixture, the wear-protection system obtains the required resilient properties.

The resilient properties serve inter alia for the absorption of the energy of impact of the materials conveyed (shock absorption). This shock absorption, that is, the reduction of the energy of impact, impacts the life time of the input section, and also of the conveyor belt.

SUMMARY OF THE INVENTION

For the purposes of a further development, the object of the invention consists in providing a conveyor of which the input section features a further improvement in respect of reduction of the energy of impact, and the resultant increased life time.

The object is achieved in that the input section comprises at least one wear-protection system which comprises at least one foamed polymer mixture.

Surprisingly, it has been found that shock absorption is advantageously affected when the wear-protection system comprises at least one foamed polymer mixture. The other properties of the input section and, with this, of the entire conveyor are not subject to any resultant adverse effect.

On the contrary, the presence of at least one foamed polymer mixture provides a weight reduction which has an advantageous effect on costs.

The terms polymer mixture and rubber mixture are used synonymously.

The invention is in principle suitable for all conveyors and conveyor belts.

Particular mention may be made here of steel cord conveyor belts and textile conveyor belts. Other advantages of the invention are particularly apparent in the case of high-temperature conveyor belts, which can take the form of steel cord conveyor belts or textile conveyor belts, and are required to convey materials to be conveyed at high temperatures (mostly >250° C.)

In a preferred embodiment, the wear-protection system comprises at least one foamed polymer mixture. This means that the wear-protection system can be composed solely of at least one foam layer. However, it is also possible that the wear-protection system has a layer structure where at least one layer is composed of at least one foamed polymer mixture. In this case, the other layers can be composed of unfoamed rubber mixtures, or can take the form of a textile layer, for example, a woven fabric.

If the wear-protection system has a layer structure, and at least one other layer made of an unfoamed rubber mixture is present, the qualitative and/or quantitative composition of the foamed polymer mixture here, other than the required blowing agents, is preferably the same as or different from the compositions of the unfoamed rubber mixture(s).

If a textile layer is present, in particular in the form of a woven fabric, the material is preferably selected from the group consisting of cotton and/or polyamide and/or polyester and/or aramid and/or glass and/or basalt and/or steel. The materials mentioned can be used alone or in the form of hybrid woven fabrics which are composed of at least one of the materials mentioned. In a preferred embodiment, woven polyamide-polyester fabric is used.

In one particularly preferred embodiment, the wear-protection system preferably comprises at least one outer sheet at the surface.

The outer sheet here can take the form of foil, can be a woven fabric, or can be composed of at least one polymeric material.

If the respective outer sheet is composed of at least one polymeric material, this is preferably a rubber selected from the group consisting of natural rubber (NR) and/or butadiene rubber (BR) and/or chloroprene rubber (CR) and/or styrene-butadiene rubber (SBR) and/or nitrile rubber (NBR) and/or butyl rubber (IIR) and/or ethylene-propylene rubber (EPM) and/or ethylene-propylene-diene rubber (EPDM) and/or polyacrylate rubber (ACM) and/or epichlorohydrin rubber (ECO) and/or chlorosulfonated polyethylene rubber (CSM) and/or silicone rubber (MVQ) and/or fluoro rubber (FPM).

The rubbers mentioned can be used here alone or in a blend.

If the outer sheet is a foil or a woven fabric, it is equally possible here to use the materials mentioned. It is particularly preferable that the composition of the foil is based on at least one fluoro polymer. In this case, additional optimized resistance to media is ensured.

The outer sheet can moreover comprise, alongside the rubber component, at least one crosslinking agent or one crosslinking system comprising a crosslinking agent and an accelerator, and also mostly other mixture ingredients, in particular at least one filler and/or at least one processing aid and/or at least one aging inhibitor and/or at least one plasticizer and/or other additional substances (for example, fibers, color pigments).

In a preferred embodiment, the wear-protection system comprises at least one foamed polymer mixture.

The qualitative and/or quantitative composition of the foamed polymer mixture here, other than the required blowing agents, can be the same as or different from the composition of an outer layer present comprising a polymeric material. In one particularly preferred embodiment, the qualitative and/or quantitative, in particular the qualitative, composition, other than the required blowing agents, is the same as the composition of the rubber mixture of the outer layer. Increased complexity in the production process is thus avoided, and other advantages are obtained in relation to time and costs. It is equally possible that the outer sheet of the wear-protection system is composed of the foamed polymer layer.

The rubber for the foamed polymer layer is selected from the group consisting of natural rubber (NR) and/or butadiene rubber (BR) and/or chloroprene rubber (CR) and/or styrene-butadiene rubber (SBR) and/or nitrile rubber (NBR) and/or butyl rubber (IIR) and/or ethylene-propylene rubber (EPM) and/or ethylene-propylene-diene rubber (EPDM) and/or polyacrylate rubber (ACM) and/or polyurethane (PU) and/or epichlorohydrin rubber (ECO) and/or chlorosulfonated polyethylene rubber (CSM) and/or silicone rubber (MVQ) and/or fluoro rubber (FPM).

The rubbers mentioned can be used here alone or in a blend.

The foamed polymer layer can moreover comprise the usual quantities of at least one filler. It is possible here to use any of the fillers known to the person skilled in the art, for example silica, carbon black, mica, carbon nanotubes, silicates, aluminum hydroxide, talc, chalk, et cetera.

It is equally possible to use any of the other additional substances known to the person skilled in the art, for example pigments, plasticizers, antiozonants, and aging inhibitors. The vulcanization of the foamed layer is generally achieved by using peroxide, for example, when EPDM is used as rubber component, or else as sulfur vulcanization when NR, BR, or SBR is used, or else by using bisphenol when, for example, FPM is used.

The foamed polymer layer also comprises at least one blowing agent. Pore-forming blowing gases are usually used as blowing agents, for example, azo and diazo compounds, where these eliminate gases (for example, $N_2$ or $CO_2$) on exposure to heat or to catalysts and thus serve for the production of foamed polymer mixtures. The blowing agents here decompose at a certain temperature during processing with formation of gas or when volatile solvents are added during polymerization or vulcanization. The foaming then takes place either on discharge from the extrusion die, that is, via vulcanization in a UHF (microwave) hot-air system or injection molding, or in open molds.

The use of blowing agents, in particular of blowing agents based on at least one acrylonitrile polymer, obtainable inter alia with Expancel®, has proven to be preferable.

Foam stabilizers can moreover also be added if necessary.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
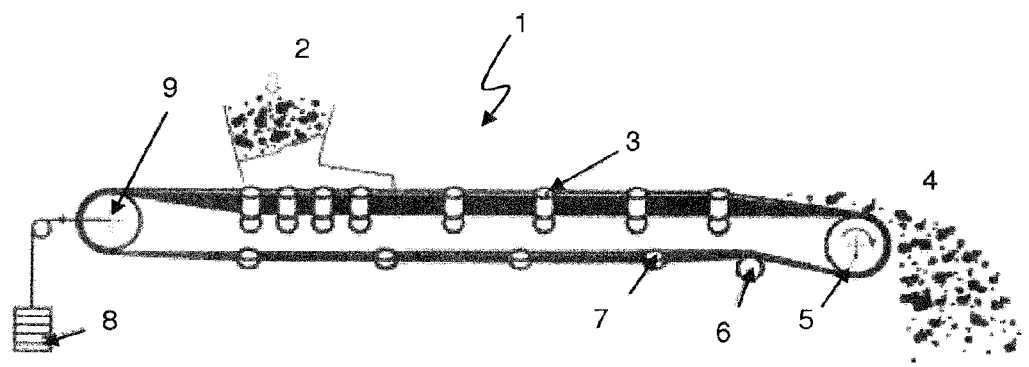
FIG. 1 shows a conveyor with a conveyor belt, a drum, and carrier rollers.

FIG. 1 shows a conveyor 1 in the form of a belt conveyor with a conveyor belt with input section 2 and discharge point 4 for materials to be conveyed. The conveyor moreover comprises upper web carrier rollers 3, lower web carrier rollers 7, a deflector drum 6, a direction-reversal drum 9, a drive drum 5, and a tensioning apparatus 8. The input section 2 comprises a transfer hopper equipped with a wear-protection system which comprises at least one foamed polymer mixture.

Figure 2:
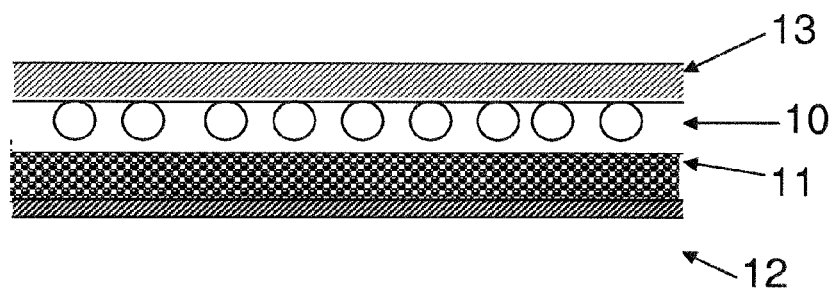
FIG. 2 shows a cross section through a wear-protection system with a foamed polymer layer between the outer sheet and the underside of the coating; and, FIG. 3 shows a cross section through a wear-protection system with a foamed polymer layer as outer sheet.

FIG. 2 shows a cross section through a wear-protection system with a foamed layer 10 located between the outer sheet 13 and the underside 12 of the coating of the wear-protection system; there is also an embedded textile layer 11 present here, and the additional foamed layer 10 is in direct contact with the textile layer 11 and the outer sheet 13. The outer sheet 13 here can take the form of foil or of rubber mixture. The underside 12 of the coating of the wear-protection system here can be based on a rubber mixture or can be composed of at least one metal.

Figure 3:
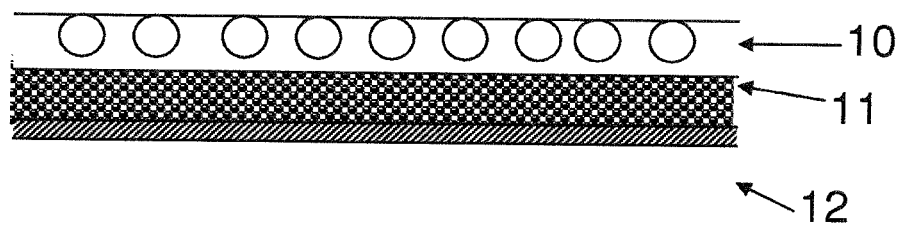

FIG. 3 shows a cross section through a wear-protection system with a foamed layer 10 which takes the form of outer sheet of a wear-protection system. Between the foamed layer 10 and the underside 12 of the coating there is a textile layer 11.

It is understood that the foregoing description is that of the preferred embodiments of the invention and that various changes and modifications may be made thereto without departing from the spirit and scope of the invention as defined in the appended claims.

KEY (Part of the Description)
1 Conveyor
2 Input for materials to be conveyed
3 Upper web carrier rollers
4 Discharge point for materials to be conveyed
5 Drive drum
6 Deflector drum
7 Lower web carrier rollers
8 Tensioning apparatus
9 Direction-reversal drum (deflector drum)
10 Foamed polymer layer
11 Textile layer
12 Underside of coating of wear-protection system
13 Outer layer (outer sheet)

What is claimed is:
1. A conveyor comprising:
a conveyor belt;
a plurality of drums;
at least one carrier roller; and, a carrier frame;

wherein the conveyor has a material-conveying upper web with a transfer section for the material to be conveyed, and a mostly material-free lower web, and wherein the transfer section has at least one wear-protection system including at least one foamed polymer mixture containing a rubber selected from the group consisting of natural rubber (NR), butadiene rubber (BR), chloroprene rubber (CR), styrene-butadiene rubber (SBR), nitrile rubber (NBR), butyl rubber (IIR), ethylene-propylene rubber (EPM), ethylene-propylene-diene rubber (EPDM), polyacrylate rubber (ACM), epichlorohydrin rubber (ECO), chlorosulfonated polyethylene rubber (CSM), silicone rubber (MVQ), and fluoro rubber (FPM) or a mixture thereof.

2. The conveyor as claimed in claim 1, wherein the rubber is selected from the group consisting of EPDM, NR, SBR, NBR, CR, ACM, ECO, CSM, MVQ, and FPM or a mixture thereof.

3. The conveyor as claimed in claim 1, wherein the transfer section comprises at least one transfer hopper having the at least one wear-protection system.

4. The conveyor as claimed in claim 3, wherein the transfer hopper is a chute, a downpipe, or a slide.

* * * * *